United States Patent [19]

Callahan

[11] Patent Number: 4,645,227
[45] Date of Patent: Feb. 24, 1987

[54] PINTLE BRACKET

[76] Inventor: William G. Callahan, 23550 E. 155th, Brighton, Colo. 80601

[21] Appl. No.: 773,787

[22] Filed: Sep. 9, 1985

[51] Int. Cl.⁴ ............................................. B60D 1/04
[52] U.S. Cl. .................................... 280/495; 280/504
[58] Field of Search ........... 280/495, 504, 507, 423 R, 280/423 A, 411 R, 411 C, 514, 515, 508, 430, 476 R, 477, 480, 500, 502

[56] References Cited

U.S. PATENT DOCUMENTS

| | | | |
|---|---|---|---|
| 1,599,834 | 9/1926 | Nabors | 280/495 |
| 2,471,521 | 5/1949 | Galey | 280/495 X |
| 2,579,319 | 12/1951 | Hudson | 280/504 |
| 3,013,817 | 12/1961 | Puccio | 280/502 |
| 3,388,930 | 6/1968 | Miller | 280/504 |
| 4,487,284 | 12/1984 | Steiner | 280/504 X |
| 4,492,386 | 1/1985 | Roberts | 280/515 X |

FOREIGN PATENT DOCUMENTS 2446875  4/1976  Fed. Rep. of Germany ...... 280/515

OTHER PUBLICATIONS

Atwood Frame Hitches advertisement, Atwood Vaccume Machine Co., Catalog No. 900, 1-30-59.

Primary Examiner—David M. Mitchell
Assistant Examiner—Charles R. Watts
Attorney, Agent, or Firm—Dean P. Edmundson

[57] ABSTRACT

A bracket is described which is adapted to be detachably mounted to the rear crossmember of the frame of a truck tractor. The bracket includes a horizontal base member, first and second depending legs, and securement means which is adapted to secure the bracket to the rear crossmember. A pintle hook is secured to the second leg member.

8 Claims, 7 Drawing Figures

PINTLE BRACKET

FIELD OF THE INVENTION

This invention relates to techniques for moving converter dollys. More particularly, this invention relates to techniques and apparatus for use with a truck tractor to move converter dollys in a trailer yard.

BACKGROUND OF THE INVENTION

When it is desired to pull more than one trailer with a single truck tractor it is necessary to connect the second trailer to the rear of the first trailer. For this purpose a converter dolly is used which comprises wheels on a frame. A fifth wheel plate is carried on top of the frame for connection to the second trailer. A tongue member connects the frame to a pintle hitch on the rear of the first trailer. In this manner the converter dolly converts the second trailer from one having wheels only at the rear into a trailer having wheels both at the rear and at the front so that it may be towed behind another trailer.

The converter dolly has a single axle, with two large wheels on each end thereof. The frame and the tongue are made of heavy steel so as to be capable of withstanding the forces involved with the towing of a heavy trailer.

Since the converter dolly may weigh as much as 3000 pounds or so, it is difficult to move around a trailer yard, particularly when there are snow, ice, mud, sand, inclines, rocks, etc. in the trailer yard. Yet, it is frequently necessary to move the dolly around, e.g., between different trailers or to ready a trailer for connection directly to a truck tractor, or to ready a trailer for connection to another trailer. This is a very awkward, difficult, and hazardous task to be conducted manually. Frequently workers are injured when moving a dolly; for example, they may injure their back, pull muscles, etc.

Although it is possible to mount a hitch onto the front bumper of a tractor for the purpose of towing a dolly, this technique has not been totally satisfactory because of potential damage to the radiator of the tractor if the driver is careless when approaching the tongue of the dolly. It is not economical for a special vehicle to be designed just for the purpose of moving converter dollys in a trailer yard.

There has not heretofore been provided safe, effective and economical means for movement of converter dollys in a trailer yard.

SUMMARY OF THE INVENTION

In accordance with the present invention there is provided a pintle bracket which is adapted to be detachably mounted to the rear crossmember of the frame of a truck tractor. The bracket comprises:

(a) a horizontal base member;
(b) a first leg depending from one end of the base member;
(c) a second leg depending from the other end of the base member;
(d) securement means adapted to secure the bracket to the rear crossmember of the frame.

A pintle hook is secured to the second leg of the base member. When the base member is placed on top of the crossmember, the first leg member depends along the front surface of the crossmember, and the second leg member depends along the rear surface of the crossmember.

After the bracket is secured to the frame, the tongue of a converter dolly may be easily and readily connected to the pintle hook to tow the converter dolly, as desired, without risk of injury and without need for any special equipment. The bracket may be easily and quickly removed from the tractor when it is no longer needed.

BRIEF DESCRIPTION OF THE DRAWINGS

The invention is described in more detail hereinafter with reference to the accompanying drawings wherein like reference characters refer to the same parts throughout the several views and in which.

DETAILED DESCRIPTION OF THE INVENTION

Figure 1:
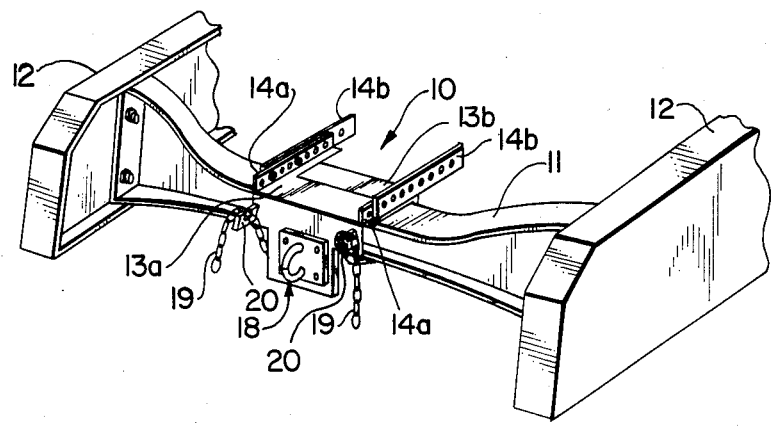
FIG. 1 is a perspective view of one embodiment of pintle bracket of this invention secured to the rear crossmember of the frame of a truck tractor.

Thus, in FIG. 1 there is shown a perspective view of one embodiment of a bracket 10 of this invention secured to the rear crossmember 11 of a truck tractor frame 12. Bracket 10 is shown in cross-section in FIG. 2.

Bracket 10, as shown, includes a two-piece horizontal base member, the two pieces being denoted as 13a and 13b. Arms 14a are secured to opposite side edge of base member 13a, and arms 14b are secured to opposite side edges of base member 13b. Each of the arms include a plurality of apertures 14c therein which enable the two sections 13a and 13b to be fastened together at a variety of positions by means of bolts or pins 14d so as to accommodate frame crossmembers of various widths.

Figure 2:
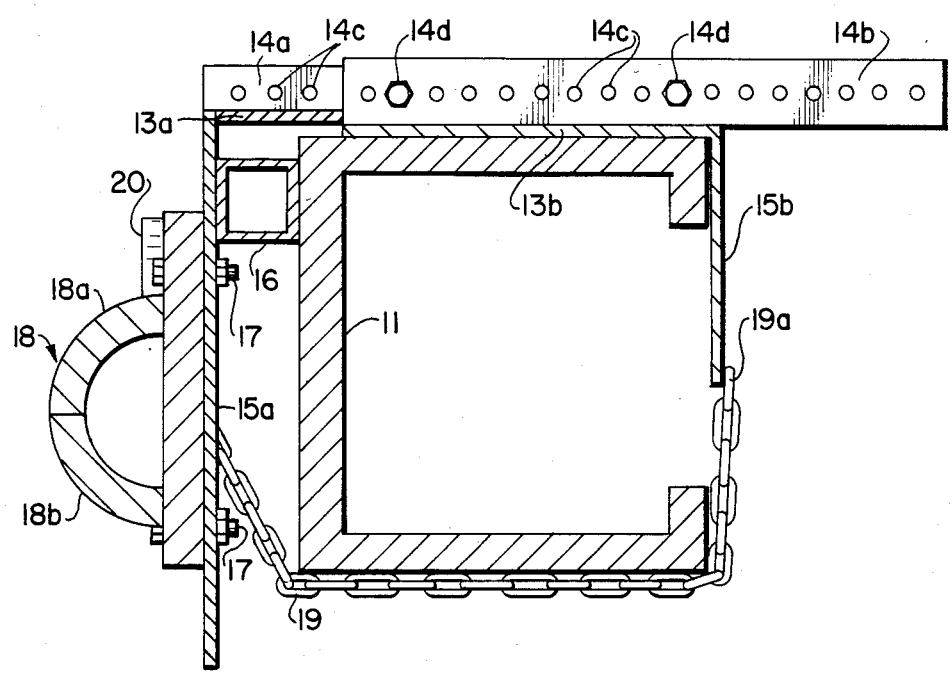
FIG. 2 is a cross-sectional view of one embodiment of a pintle bracket of the invention secured to a rear crossmember of a truck tractor.

Depending from section 13a is a leg member 15a, and depending from section 13b is a leg member 15b. Preferably these legs depend from the base sections at right angles, as shown. Leg 15a extends along the rear surface of crossmember 11, and leg 15b extends along the front surface of crossmember 11. If desired, a spacer 16 may be secured between leg 15a and the rear surface of crossmember 11 (as shown in FIG. 2) to allow room for bolts 17 which secure pintle hook 18 to leg 15a.

Pintle hook 18 is conventional and typically comprises two sections 18a and 18b. Section 18b is stationary while section 18a is adapted to pivot so that the hook may be opened to receive the end of the tongue of a converter dolly. Then the hook may be closed in conventional fashion.

Bracket 10 is secured to crossmember 11 by means of chains 19 which are secured at one end 19a to leg member 15b, for example by means of welds. Each chain extends under crossmember 11 and is hooked or secured in a slot in finger or tab 20 (which is carried on the face of leg member 15a). This illustrates one technique for holding the bracket in place during use. When it is desired to detach the bracket all that is required is to unhook the chains 19 from the slots in tabs 20 and then lift the bracket off the crossmember 11.

Figure 3:
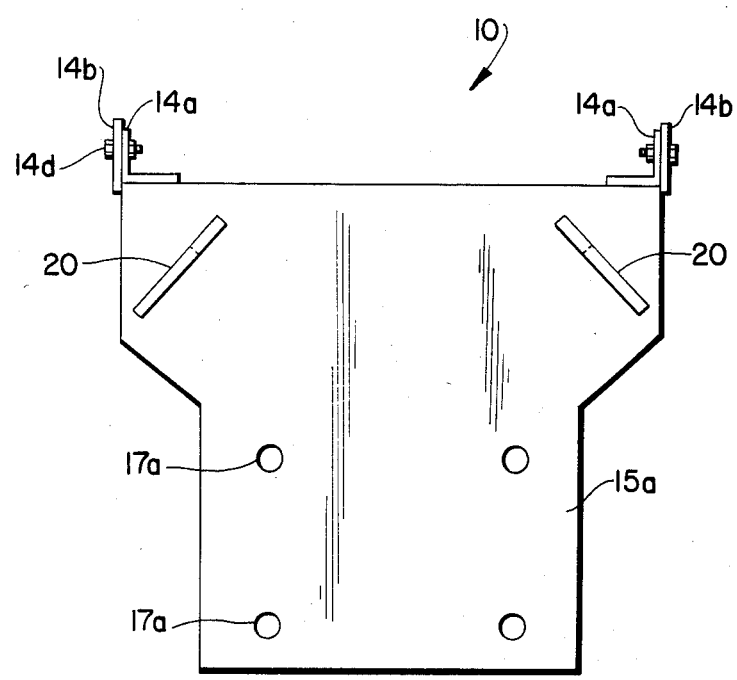
FIG. 3 is an elevational view of a pintle bracket of the invention prior to attachment of a pintle hook.

In FIG. 3 there is shown an elevational view of one embodiment of bracket 10 of the invention. Apertures 17a in leg member 15a are for securing the pintle hook to the bracket (as illustrated in FIGS. 1 and 2). Tabs 20 are sloped in the manner shown. If desired, there may be a plurality of vertically spaced tabs along each edge of leg member 15a.

Figure 4:
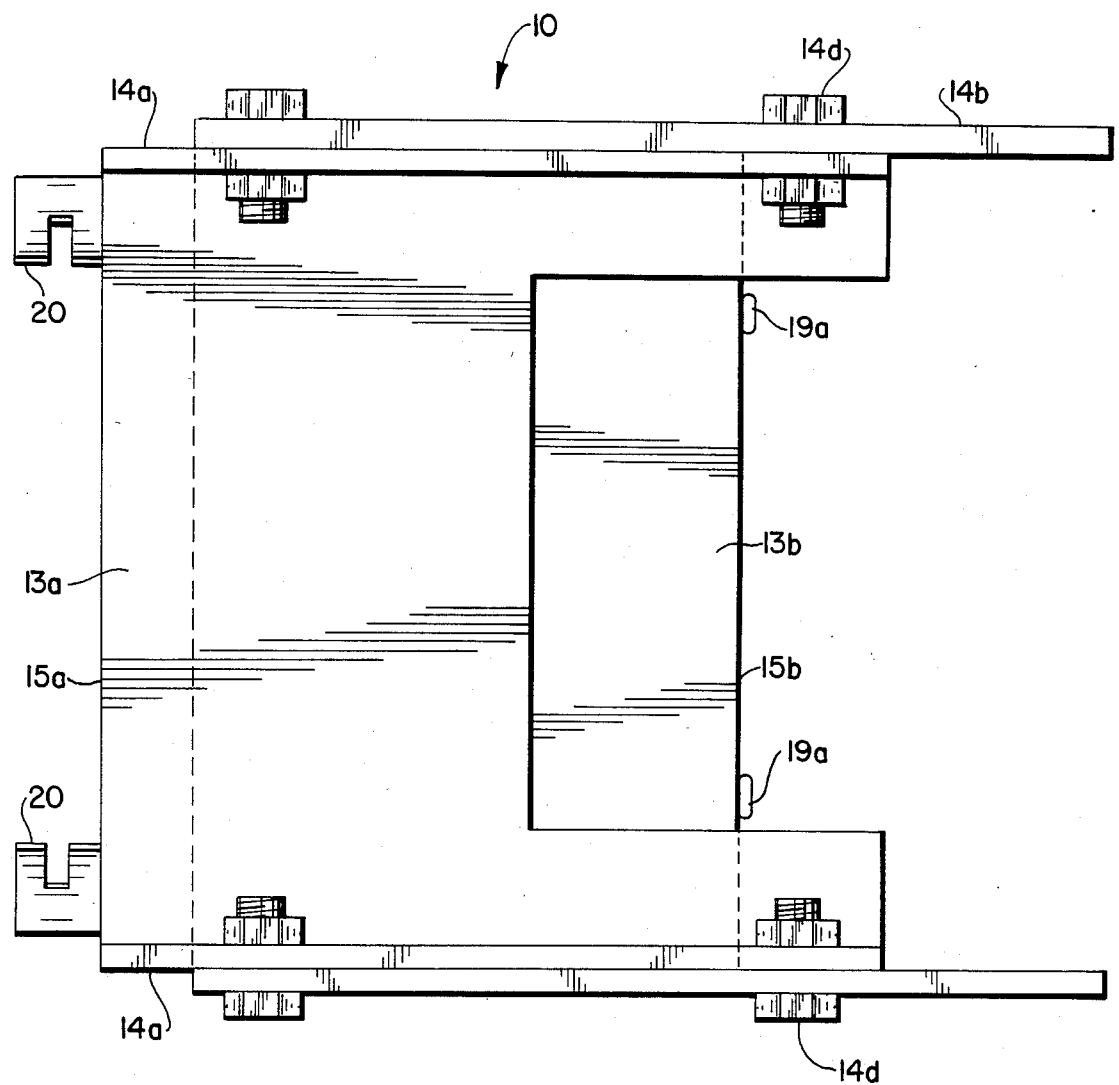
FIG. 4 is a top view of a pintle bracket of this invention of the type shown in FIG. 1.

In FIG. 4 there is shown a top view of bracket 10 (without the pintle hook attached). This illustrates one embodiment where the horizontal base member comprises two sections 13a and 13b. The base sections are secured together by means of bolts or pins 14d which extend through registering apertures in arms 14a and 14b on each side of the bracket. The ends 19a of the chains are seen since they are secured to depending leg 15b.

Figure 5:
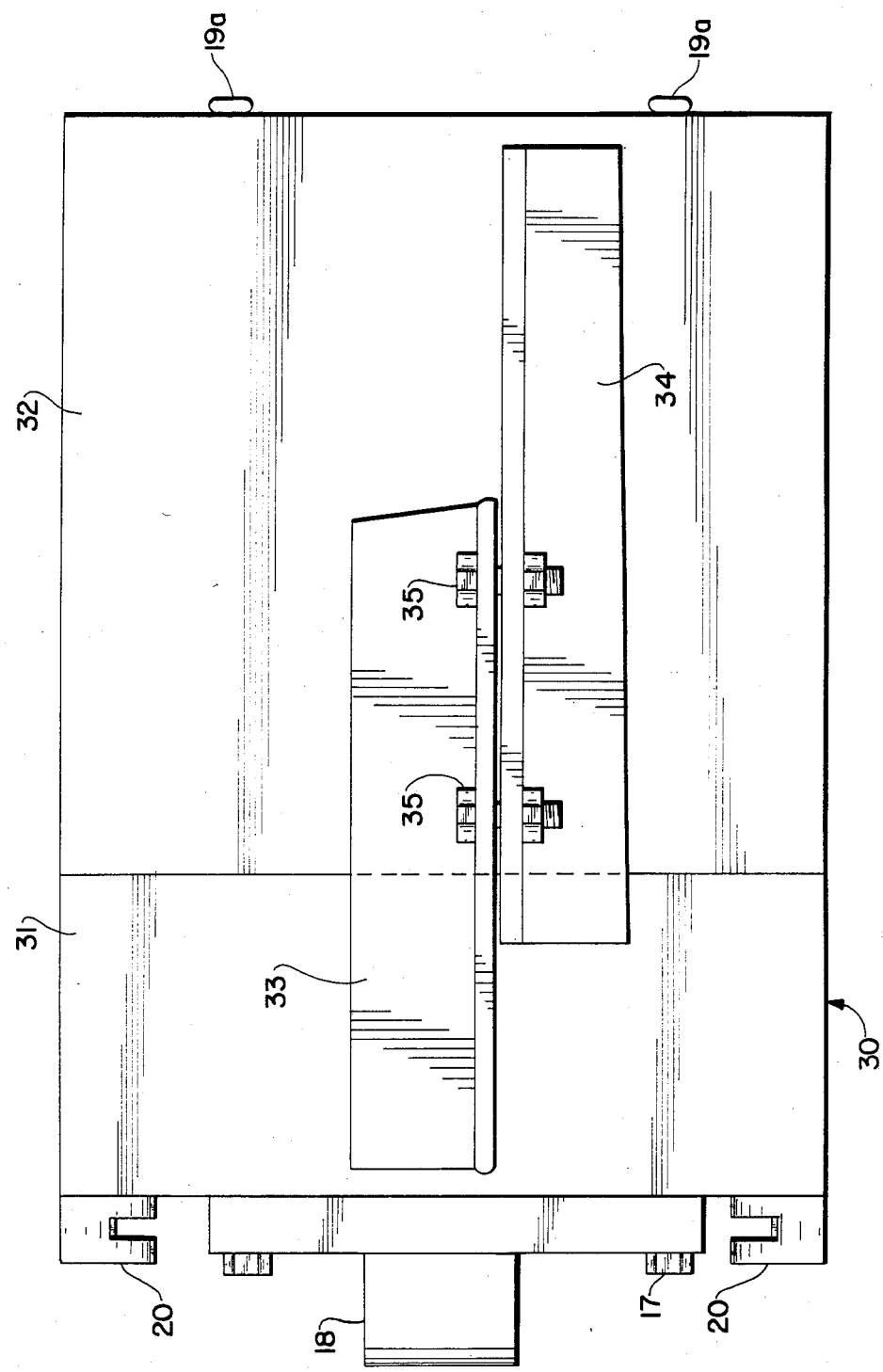
FIG. 5 is a top view of another embodiment of pintle bracket of this invention.

In FIG. 5 there is shown a top view of another embodiment of bracket 30 of the invention. In this embodiment there are two sections 31 and 32 forming the horizontal base member. Arm 33 comprises an angle iron which is securely attached at one end to section 31 (e.g., by welds). Arm 34 comprises an angle iron which is securely attached at one end to section 32. Each arm includes a plurality of spaced apertures therealong. When the desired length of the horizontal base is obtained (by moving section 31 relative to section 32), then bolts or pins 35 are placed through registering apertures in the arms and are secured in place. Pintle hook 18 is shown secured to one of the depending legs of bracket 30 by means of bolts 17. One end 19a of each of the chains is shown attached to the other depending leg of the bracket.

Although the embodiments of the brackets shown in FIGS. 1-5 illustrate the attachment of one end 19a of the chain to the depending leg member 15b, end 19a could instead be secured to depending leg member 15a. In other words, end 19a of the chain 19 could be secured to the same leg member to which the pintle hook is attached. The opposite end of the chain may then be removably attached to an appropriate engagement means carried on the other depending leg member. For example, tabs 20 may be secured to leg member 15b, if desired.

Figure 6:
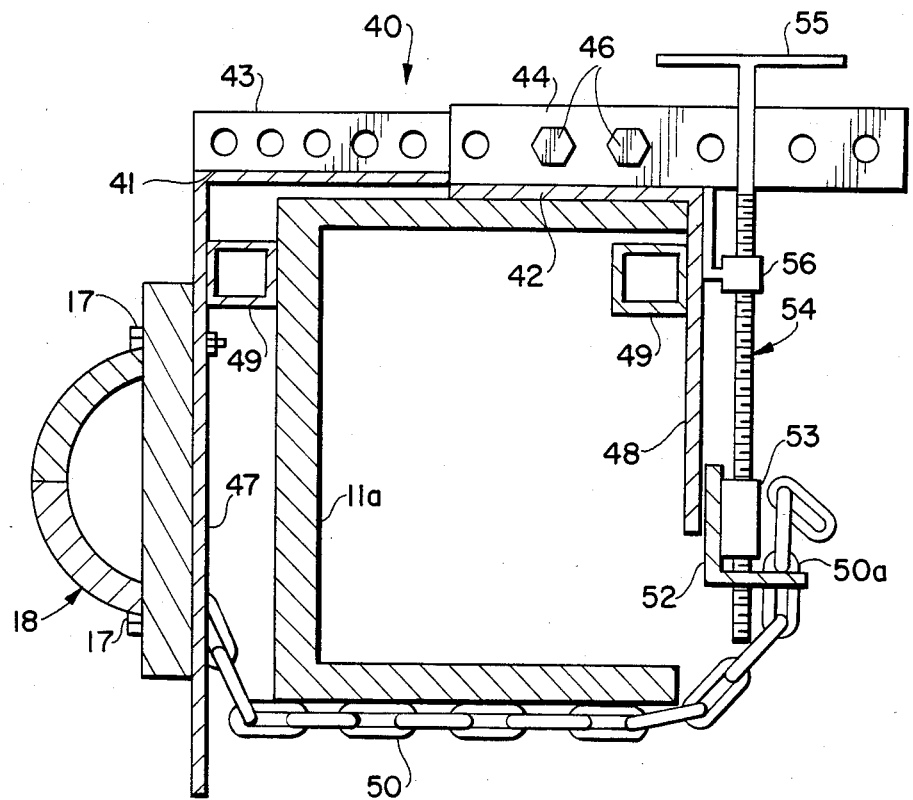
FIG. 6 illustrates another embodiment of pintle bracket of the invention.

FIG. 6 illustrates another embodiment of pintle bracket 40 of the invention.

Pintel bracket 40 is shown in cross-section on a rear crossmember 11a of a frame of a truck tractor. This bracket also has two base sections 41 and 42. Arms members 43 and 44 are secured respectively to base sections 41 and 42. Apertures 45 are provided at various positions through the arm members to accommodate pins 46 which extend through the arm members to secure the base sections together.

Leg member 47 extends downwardly from the base section 41, and leg member 48 extends downwardly from base section 42. Preferably, there is a flange 49 secured to the interior face of each leg member, as shown. The flange is preferably spaced downwardly from the base section about ⅜ inch so that one edge of the rear crossmember 11a may fit between the flange and the base section when the bracket is secured to the rear crossmember. The presence of the flange prevents the bracket 40 from tilting or turning with respect to the crossmember (e.g. when a very heavy tongue is connected to the pintle hook 18). If a flange 49 is secured to the interior face of each leg member the bracket 40 can be used in the manner described regardless of whether the front or the rear edge of the crossmember is open.

In this embodiment one end of chain 50 is secured (e.g. by welds) to leg member 47. The opposite end 50a of the chain 50 is received in an appropriate slot in transverse member 52. Threaded bolt 54 is threadably received in arm 56 secured to leg member 48 and also extends through mounting 53 carried by transverse member 52. Handle 55 at the upper end of bolt 54 may be rotated in order to cause the transverse member 52 to be raised after end 50a of chain 50 has been positioned in the slot. This enables the chain 50 to be tightened, thereby firmly securing the bracket 40 to the rear crossmember. When it is desired to remove the bracket it is only necessary to rotate handle 55 in the opposite direction to lower member 52 and loosen the chain until it can be detached from the slot in member 52.

Figure 7:
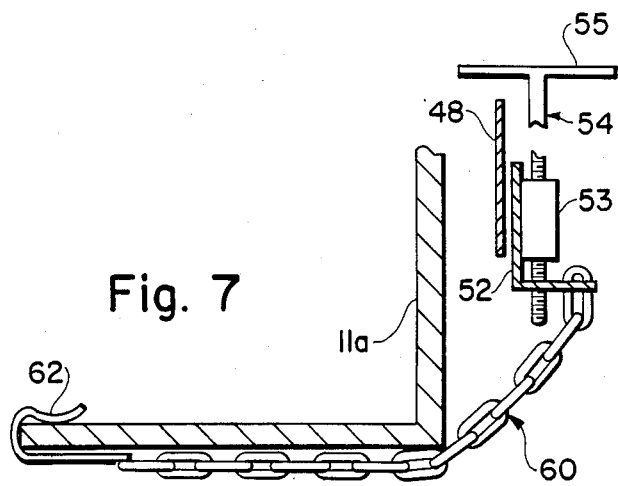
FIG. 7 illustrates yet another embodiment of the pintle bracket of this invention.

Another embodiment for preventing the pintle bracket from tilting or rotating relative to the crossmember 11a is illustrated in FIG. 7. In this embodiment a chain 60 having hook 62 on one end thereof is hooked over one edge of the crossmember, as shown. The opposite end of the chain is positioned in a slot in transverse member 52. Then when the bolt 54 is tightened, transverse member 52 is raised and the chain 60 is tightened.

Other variations are possible without departing from the scope of the present invention. For example, a handle member may be included (e.g. attached to the top of one of the base sections) to facilitate carrying of the bracket and positioning the bracket onto the crossmember.

What is claimed is:

1. A pintle bracket adapted to be detachably mounted to a rear crossmember of a truck tractor frame, wherein said crossmember includes a front surface and a rear surface, said bracket comprising:
   (a) a horizontal base member having front and rear sections which are adapted to be secured together at a plurality of spaced positions in a manner such that the length of said horizontal base member is adjustable,
   (b) a first leg member depending from said front section of said base member;
   (c) a second leg member depending from said rear section of said base member, said second leg member being adapted to securely support a pintle hook, wherein said second leg member includes attachment means;
   (d) securement means comprising two chains which are adapted to extend beneath said crossmember and connect said first and second leg members to secure said bracket to said crossmember, wherein each said chain includes a first end and a second end, wherein said first leg of each said chain is securely attached to said first leg member, and wherein said second end of each said chain is adapted to be detachably connected to said attachment means, wherein when said horizontal base member rests on top of said crossmember said first leg merber is adspted to depend along said front surface of said crossmember and said second leg member is adapted to depend along said rear surface of said crossmember.

2. A bracket in accordance with claim 1, wherein said front and rear sections each include arms having a plurality of spaced apart apertures therein, wherein said arms of said front section are adapted to be secured to said arms of said rear section by means of bolts extending through said apertures.

3. A bracket in accordance with claim 1, wherein said first and second leg members each comprise a metal plate.

4. A pintle bracket adapted to be detachably mounted to a rear crossmember of a truck tractor frame, wherein said crossmember includes a front surface and a rear surface, said bracket comprising:
(a) a horizontal, planar base member having front and rear sections which are adapted to be secured together at a plurality of spaced positions in a manner such that the length of said horizontal base member is adjustable,
(b) a first leg member comprising a first metal plate depending from said front section of said base member, said first leg member being perpendicular to the plane of said base member;
(c) a second leg member comprising a second metal plate depending from said rear section of said base member, said second leg member being perpendicular to the plane of said base member; wherein said second leg member includes attachment means;
(d) securement means comprising two chains which are adapted to extend beneath said crossmember and detachably connect said first and second leg members; wherein each said chain includes a first end and a second end; wherein said first leg of each said chain is securely attached to said first leg member, and wherein said second end of each said chain is adapted to be detachably connected to said attachment means, wherein when said horizontal base member rests on top of said crossmember said first leg member is adapted to depend along said front surface of said crossmember and said second leg member is adapted to depend along said rear surface of said crossmember.

5. A bracket in accordance with claim 4, wherein said front and rear sections each include arms having a plurality of spaced apart apertures therein, wherein said arms of said front section are adapted to be secured to said arms of said rear section by means of pins extending through said apertures.

6. A bracket in accordance with claim 4, further comprising a pintle hook secured to said second leg member.

7. A bracket in accordance with claim 6, wherein said pintle hook is secured to said second leg member by means of bolts.

8. A bracket in accordance with claim 4 wherein said second leg member includes first and second finger members, each said finger member having a slot therein which is adapted to slidably receive one of said chains.

* * * * *